United States Patent Office 3,375,382
Patented Mar. 26, 1968

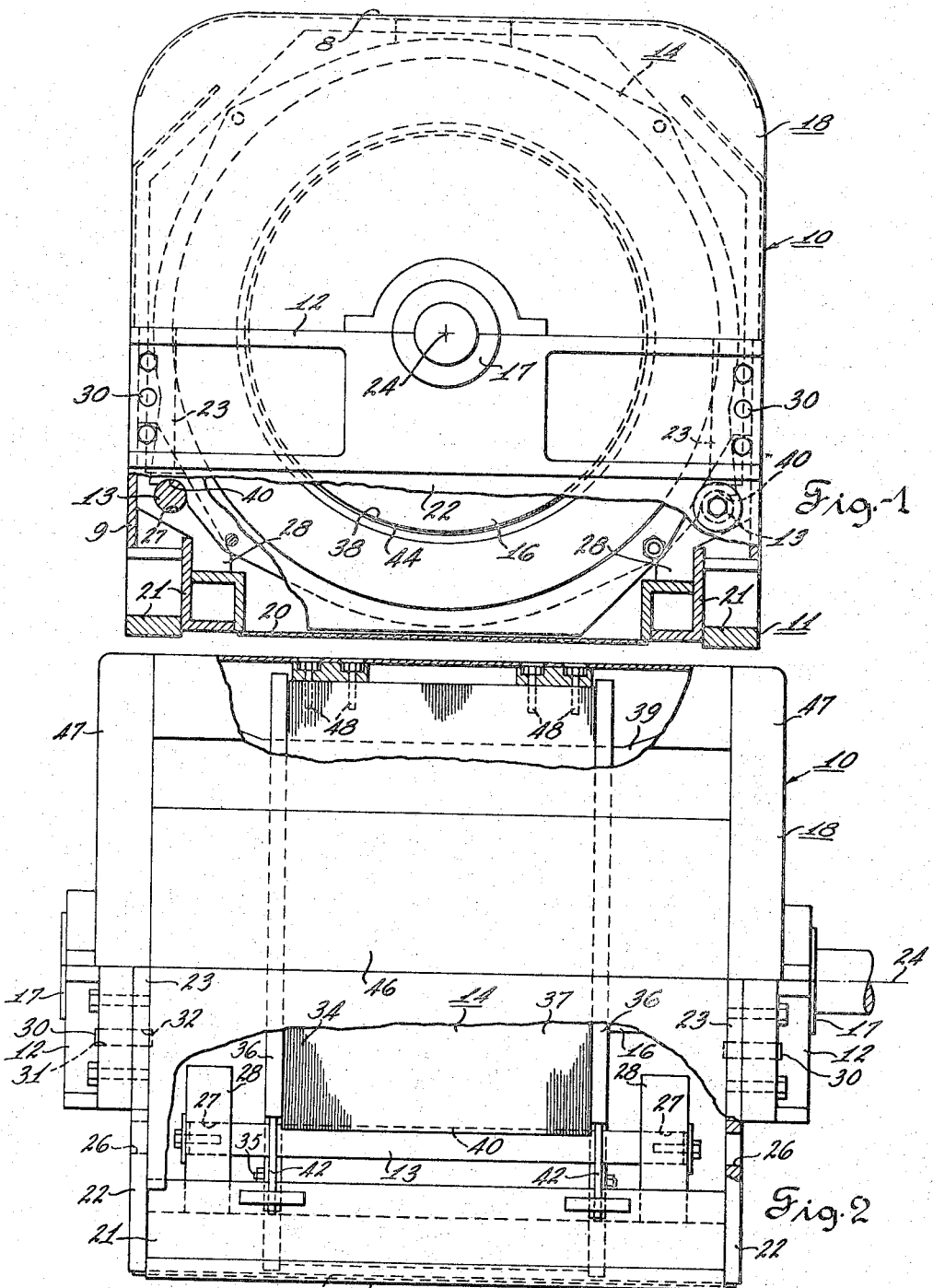

3,375,382
DYNAMOELECTRIC MACHINE
Richard H. Barber, Greendale, and Joseph T. McKean, New Berlin, Wis., assignors to Allis-Chalmers Manufacturing Company, Milwaukee, Wis.
Filed Jan. 13, 1965, Ser. No. 425,261
6 Claims. (Cl. 310—90)

This invention relates generally to dynamolelectric machines and more specifically to the construction of large electric motors and generators.

In the past the cost of manufacturing large dynamoelectric machines was extremely high because of the difficulty in assembling the stator and the rotor of the machine with an accurate air gap. Expensive and time consuming machining and assembly were required on the large stator supports and other members to properly align the motor rotor and the stator to obtain the proper air gap. In addition, the machines frequently had to be disassembled and adjusted to obtain the desired air gap.

Another factor that added to the high cost of these machines was that very few parts were interchangeable with machines of other sizes and types. Obviously, the standardization of parts for these machines would greatly reduce their cost.

The dynamoelectric machine of this invention overcomes the problems mentioned above by providing a standard base having mounting bars accurately positioned therein and a bearing bracket attached to the base so that its center line is accurately positioned relative to the mounting bars. The stator core is made up of a stack of laminations and has a pair of grooves formed therein that are accurately positioned relative to the center line of the bore in the stator core. The grooves fit over the mounting bars in the base so that when the stator is positioned on the mounting bars its center line is automatically perfectly aligned with the center line of the bearing brackets. Hence, the rotor which is mounted in bearings in the bearing brackets is perfectly aligned with the bore in the stator core which automatically provides an accurate, uniform air gap for the machine. The accurate positioning and alignment between the bearing bracket and the mounting bars on the base is provided by relatively simple machining on the base and bearing bracket. Thus, the complex and expensive machining of the bearing and stator support members as was required in the prior art is eliminated. In addition, the bearing brackets can be used with a variety of bases.

Therefore, it is the object of this invention to provide an improved construction of a dynamoelectric machine.

Another object of this invention is to provide large dynamoelectric machines in which the air gap alignment can be easily and accurately formed prior to assembly so that no adjustments are required after assembly.

Another object of this invention is to provide a new and improved dynamoelectric machine which is easier to assemble and disassemble.

Another object of this invention is to provide a construction for dynamoelectric machines in which the parts are interchangeable for motors of various sizes and types.

Other objects and advantages of this invention will be apparent from the following description when read in connection with the accompanying drawing, in which:

FIG. 1 is an end view partially in section of a dynamoelectric machine of this invention;

FIG. 2 is a side view of the machine of FIG. 1 with portions removed;

Figure 3:
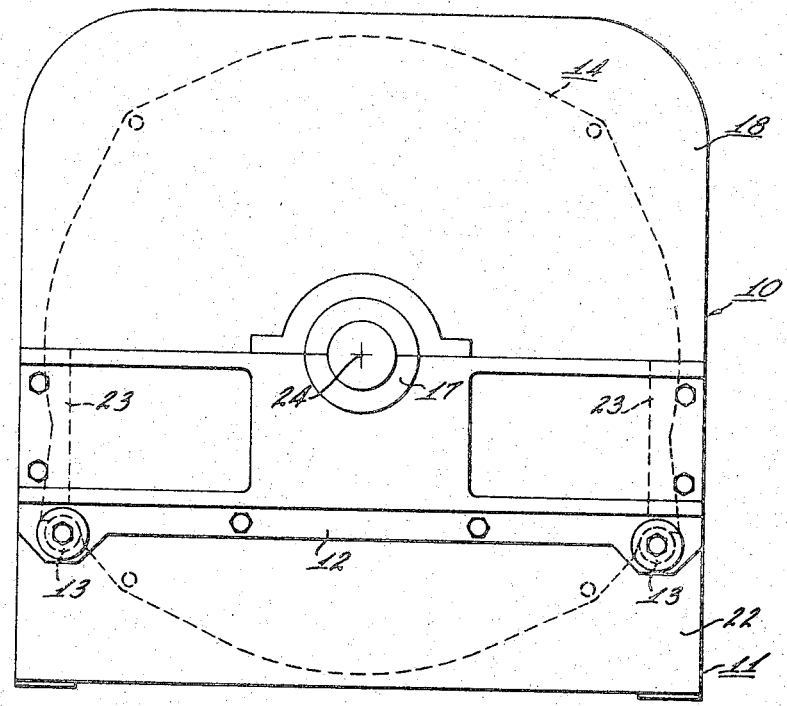
FIG. 3 is an end view of a dynamoelectric machine of this invention showing an alternate mounting arrangement for the bearing bracket.

Referring to the drawing in more detail, the invention is illustrated in a large electric motor 10. The motor is made up generally of a base 11 having bearing brackets 12 attached thereto and mounting bars 13 connected to the base. A stator 14 is mounted on the bars 13 and a rotor 16 is positioned in the bore of the stator and rotatably mounted in bearings 17 in the bearing bracket 12. An appropriate housing 18 is positioned over the stator and rotor members and cooperates with the base 11 to form an enclosure for the motor.

The base member 11 is an important part of this motor assembly and comprises a base plate 20 having longitudinally extending bracing members 21 and side plate members 9 on each side and support plates 22 at each end that extend between the bracing members and upward from the base plate. In the embodiment illustrated in FIGS. 1 and 2, the end plates 22 have upright extensions 23 at each side of the base member.

Supports are provided on the base for receiving and supporting the stator. As shown in the drawings, the support members can be in the form of mounting bars 13 connected to and supported by the base member in any suitable way such as being fitted into holes 26 or grooves in the end plates 22 or holes or grooves 27 in support feet 28. The support feet 28 are connected to the side plate 9 and bracing members 21 are positioned axially inward of the end plates. The mounting bars 13 extend longitudinally of the base and are preferably substantially parallel to the base. But most important, they are precisely and accurately positioned relative to the center line of the bearing brackets 12.

The bearing brackets are attached to the end plates 22 and extend across the ends of the base 11. The bearing brackets 12 are mounted on the end plates 22 so that the center lines 24 of the bearing brackets are aligned with each other and are accurately located relative to the mounting bars 13. This may be done in any suitable way such as by using appropriate dowel means 30 interengaging the bearing brackets 12 and the end plates 22. This arrangement requires only that the dowel holes 31, 32 in the brackets and end plates, respectively, be accurately located relative to the bearing center line and the bars 13. Hence, providing this precise alignment between the bearing and the bars is a relatively simple maching operation that can be carefully and accurately controlled.

The motor stator 14 is made up of a plurality of annular steel laminations 34 stacked and clamped together in the conventional manner such as by bolts 35 and end plates 36 to form the stator core 37 having a cylindrical bore 38. Appropriate windings 39 are positioned in the winding slots of the core. Two axially extending parallel grooves 40 are formed in the peripheral surface of the core. These grooves 40 are intended to fit on the mounting bars 13 on the base and are formed in the laminations as punched with an accurate predetermined relation to the center line of the bore of the stator. Hence, when the stator is positioned on the base with the grooves fitted on the bars, there is an exact alignment between the center line of the stator bore 38 and the center of the bearing brackets 12 because they are both accurately referenced to the mounting bars through the dowel means 30. The position of the grooves can be very accurately controlled because of the close tolerances that can be maintained in the punched laminations 34 that form the stator core 37. The stator 14 is clamped to the base and held in firm contact with the bars 13 by bolts 42 attached to end plates 36 to maintain the alignment of the stator and rotor.

The rotor 16 is of conventional design and is mounted in appropriate bearings 17 in the bearing brackets 12. The outer cylindrical surface of the rotor is accurately machined so that when the rotor is mounted in the bearings and positioned within the bore of the stator a uniform air gap 44 is formed between the rotor and stator bore without any radial adjustment of either the rotor or the stator. In some cases some adjustment may be required between the rotor and the stator to obtain an exact axial alignment. However, this can be done by sliding the assembled stator core axially on the mounting bars.

An appropriate motor housing 18 is provided to form with the base an enclosure for the motor. As illustrated in the drawings, the motor housing 18 has a central member 46 with appropriate end members 47 detachably connected thereto. The housing fits over the assembled motor and stator and is connected to the top of the stator by appropriate means such as bolts 48.

The versatility of this design is brought out by the fact that the motor housing 18 and base 11 are formed with removable end members. Furthermore, the bearing brackets are detachably connected to the upright portions of the base members at either end. Therefore, the same housing and base end members and bearing brackets can be used with a number of bases having different axial lengths. All that is required to change the design to accommodate a larger motor is to provide a longer base member and a longer central housing member. Furthermore, the width of the base member and housing member can be widened if desired by providing appropriate inwardly extending flanges at each end to which the end members and bearing brackets can be attached.

Figure 4:
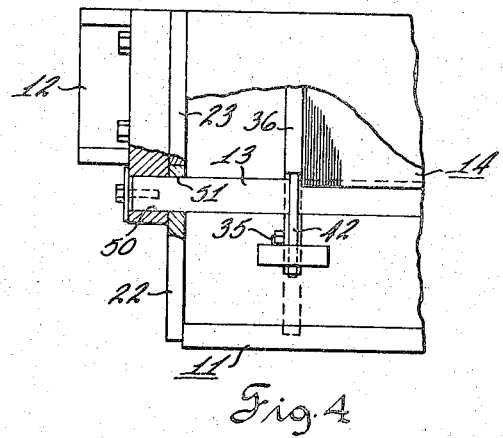
FIG. 4 is a partial side view in section of the machine of FIG. 3.

In an alternate design shown in FIGS. 3 and 4, the mounting bars 13 extend through appropriate holes 50, 51 in the bearing brackets 12 and end plates 22. In this arrangement the mounting bars 13 are supported by the bearing brackets which are in turn connected to and supported by the end plates 22 of the base members. This, of course, eliminates the need for additional support members on the base such as shown in FIGS. 1 and 2. In addition, the mounting bars serves as the dowel for accurately positioning the bars 13 relative to the center line of the bearing brackets. This, of course, elinminates the need for accurately positioning the base relative to the bearing bracket and further simplifies the manufacture of the machine.

As was pointed out above, the mounting bars can be mounted on either the support feet as in FIG. 1 or the bearing housing as in FIG 3. Therefore the same mounting bars can be used for a large motor having a large variety of axial lengths by merely selecting the proper support arrangement for the mounting bars.

Although but two embodiments have been illustrated and described it will be apparent to those skilled in the art that modifications other than those shown may be made without departing from the spirit of the invention or from the scope of the appended claims.

The embodiments of the invention in which an exclusive property or privilege is claimed are defined as follows:

1. A motor comprising a base,
a pair of support members on said base,
a bearing bracket mounted on each end of said base, said bearing bracket being aligned and accurately positioned relative to said support members,
bearings in said bearing brackets,
a shaft rotatably mounted in said bearings and a motor rotor mounted on said shaft,
a motor stator having an annular core with windings positioned therein, the outer surface of said core having a pair of spaced apart grooves formed therein for fitting said support members to mount said stator on said base and automatically align said stator relative to said rotor to form a uniform air gap therebetween.

2. A motor comprising a base,
a bearing bracket mounted on each end of said base, a pair of support members mounted on said brackets and being accurately positioned relative to the center line of said brackets,
bearings in said bearing brackets,
a shaft rotatably mounted in said bearings and a motor rotor mounted on said shaft,
a motor stator having an annular core with windings positioned therein, the outer surface of said core having a pair of spaced a part grooves formed therein for fitting said support members to mount said stator and automatically align said stator relative to said rotor to form a uniform air gap therebetween.

3. The motor of claim 2 in which the support members are bars extending longitudinally of said base and being mounted on each of said bearing brackets.

4. A motor comprising a base,
a pair of mounting bars extending longitudinally of and being connected to said base,
a bearing bracket mounted on each end of said base in a plane perpendicular to said bars,
dowel means interengaging said base and said brackets to accurately position said brackets relative to said mounting bars,
bearings in said bearing brackets,
a shaft rotatably mounted in said bearings and a motor rotor mounted on said shaft and aligned with said stator,
a motor stator having an annular core with windings positioned therein, the outer surface of said motor stator having a pair of spaced apart substantially parallel grooves formed therein for fitting said mounting bars to mount said stator on said base and automatically align said stator relative to said rotor to form a uniform air gap therebetween.

5. The motor of claim 4 in which support feet are mounted on said base and have grooves formed therein for receiving said bars, said feet being positioned axially inward of said bracket.

6. A motor comprising a base,
a bearing bracket mounted on each end of said base and having mounting holes formed therein, said holes being accurately positioned relative to the center line of said brackets,
a pair of mounting bars extending longitudinally of said base and extending through said holes to accurately position said bars relative to said bracket center lines,
bearings in said bearing brackets,
a shaft rotatably mounted in said bearings and a motor rotor mounted on said shaft and aligned with said stator,
a motor stator having an annular core with windings positioned therein, the outer surface of said motor stator having a pair of spaced apart substantially parallel grooves formed therein for fitting said mounting bars to mount said stator on said base and automatically align said stator relative to said rotor to form a uniform air gap therebetween.

References Cited

UNITED STATES PATENTS

| 2,704,693 | 3/1955 | Schwan | 310—90 |
| 2,870,356 | 1/1959 | Gibson | 310—42 |
| 3,064,152 | 11/1962 | DePaul et al. | 310—90 |
| 3,110,832 | 11/1963 | Worthington et al. | 310—91 |
| 3,200,275 | 8/1965 | Lindgren | 310—90 |

MILTON O. HIRSHFIELD, *Primary Examiner.*

L. L. SMITH, *Assistant Examiner.*